Aug. 4, 1959 L. F. BIRD 2,898,545
AUTOMATIC WATTAGE REGULATOR FOR ELECTRICAL DEVICES
Original Filed May 12, 1950 2 Sheets-Sheet 1
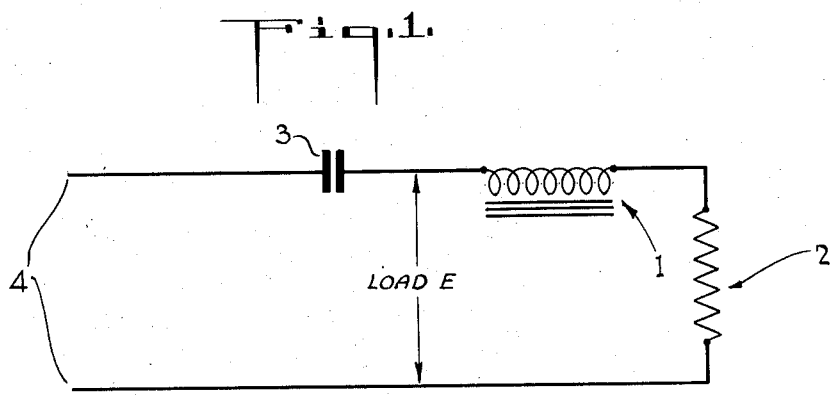
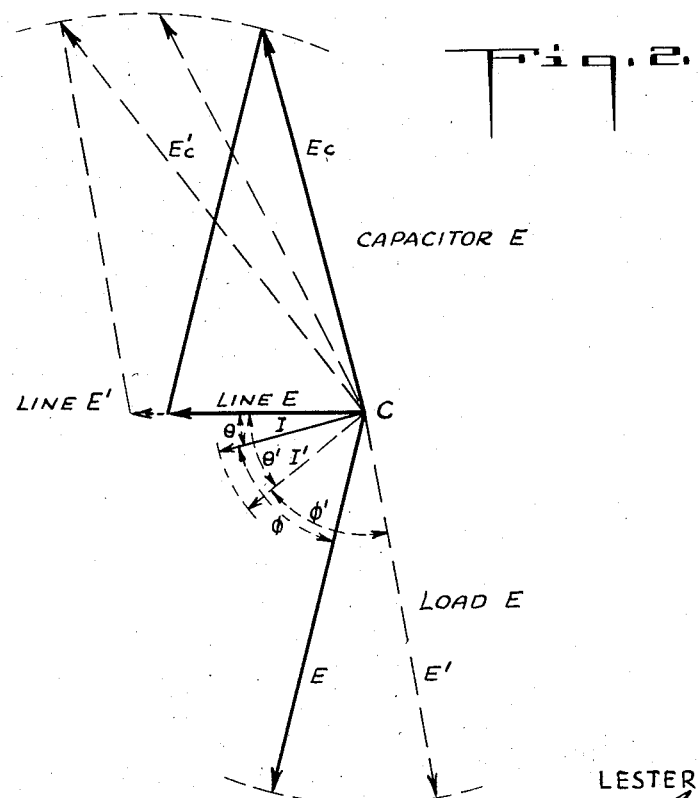
INVENTOR.
LESTER F. BIRD
BY
ATTORNEY Aug. 4, 1959            L. F. BIRD            2,898,545
AUTOMATIC WATTAGE REGULATOR FOR ELECTRICAL DEVICES
Original Filed May 12, 1950            2 Sheets-Sheet 2
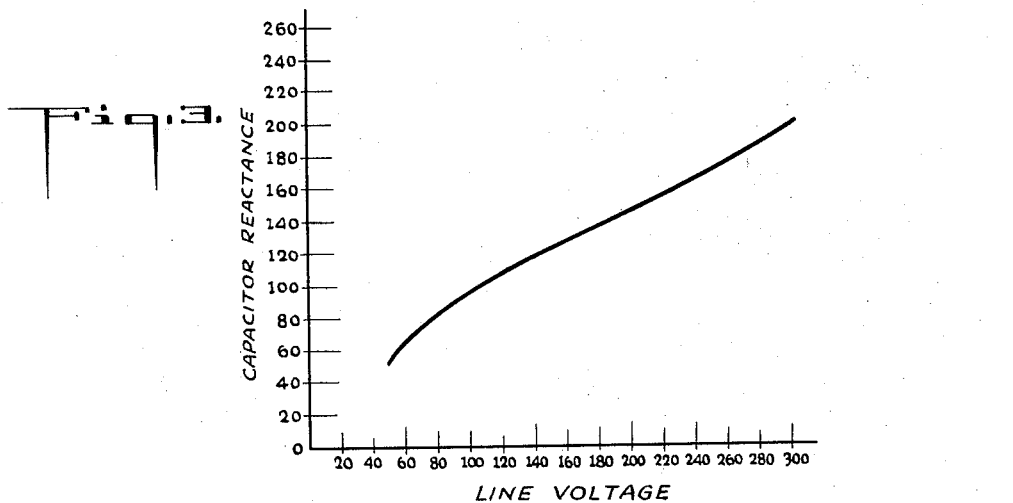
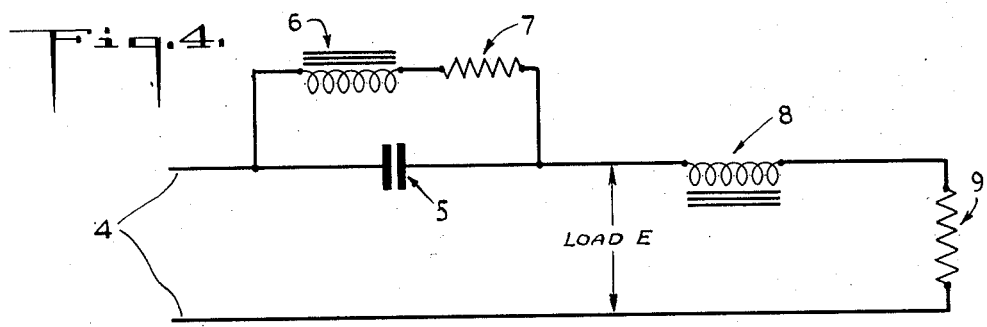
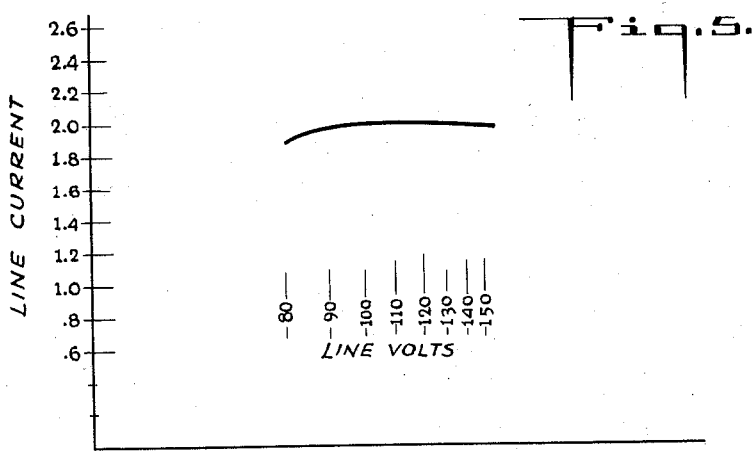
INVENTOR.
LESTER F. BIRD
BY
ATTORNEY

United States Patent Office 2,898,545
Patented Aug. 4, 1959

2,898,545

AUTOMATIC WATTAGE REGULATOR FOR ELECTRICAL DEVICES

Lester F. Bird, Newark, N.J., assignor to Engelhard Industries, Inc., a corporation of New Jersey Continuation of abandoned application Serial No. 161,563, May 12, 1950. This application December 24, 1954, Serial No. 477,565

2 Claims. (Cl. 323—77)

The present invention deals with automatic wattage regulators for electrical devices and more particularly with automatic wattage regulators for maintaining the wattage consumption of an electrical device constant and independent of variations of the line supply voltage.

This application is a continuation of abandoned application Serial No. 161,563, filed May 12, 1950.

The difficulties associated with fluctuations in line supply voltages are well known and many efforts have been made to provide means and methods for their control. The most common practice is the provision of a constant voltage device for the purpose of eliminating line voltage fluctuations before reaching the load. This is an expensive practice.

It is an object of the present invention to provide a simple device which can be added to electrical power consuming equipment to insure constant operating conditions, freedom from variations due to fluctuations or variations of supply voltages, and which will permit normal functioning of the electrical equipment to which it is applied. It is another object of the present invention to provide an automatic wattage regulator which will function with loads consisting of high or low voltage discharge devices or lamps or discharge tubes having hot or cold electrodes or fixed or variable voltages. It is a further object of the present invention to provide a control means which automatically protects equipment from overload conditions, automatically produces increased voltage for ignition purposes for lamps where such is needed, and which minimizes transient effects produced in supply line voltages by many electrical industrial machines. It is a still further object of the present invention to provide an automatic control means which will provide essentially constant voltages and power to a load device even though the supply line voltage may vary as much as plus or minus twenty percent. Other objects and advantages of the present invention will become apparent from the description hereinafter following and the drawings forming part hereof in which:

Figure 1 is a diagrammatic representation of a conventionalized load circuit having reactance, Figure 2 illustrates a vector diagram for the circuit of Figure 1, Figure 3 is a graphic illustration of the relationship between capacitor reactance and line voltage necessary for constant current, Figure 4 is a diagrammatic representation of a circuit according to the present invention, and Figure 5 is a graphic illustration of the relationship between line current and line voltage according to the present invention.

In order to clarify the function of the present invention, a theoretical consideration of a conventional circuit and its components is deemed essential to set forth such factors involved in the present invention as may not be apparent from the illustrations dealing with the circuit of the invention.

For example, Figure 1 illustrates a conventionalized load circuit having reactance and comprising an inductance 1 and resistance 2 in series. A capacitor 3 is in series connection with said load and a source of current 4. In such a circuit, there will be a current flow therethrough which is determined by the applied voltage and the impedance of the circuit. This current will change if either the impedance or the applied voltage is altered. If both the applied voltage and the impedance are altered at the same time and in the correct amounts, the current can be maintained unchanged. This can be accomplished by altering the size of the capacitor 3 alone as the voltage is altered. Any reasonable change in line voltage can, therefore, be regulated to give a constant current by a corresponding adjustment in the size of the capacitor 3. The adjustment of the capacitor requires a larger value of capacitance for reduced line voltages and smaller values of capacitance for increased line voltages.

Figure 2 illustrates a vector diagram for the circuit of Figure 1 and which diagram shows a voltage-current relationship, as hereinafter described, in conjunction with a load of any form whatever as long as it has inductive reactance, e.g. inductive reactance as illustrated in Figure 1. In the vector diagram, there is illustrated a line input voltage vector, capacitor voltage vector, a load voltage vector and a current vector. The current vector is always at right angles to the capacitor voltage vector and making a leading angle theta with the line voltage vector. Below the line voltage vector is the load vector making a phase angle phi with the current vector. Upon a change in line voltage, e.g. an increase in line voltage, the capacitor voltage vector increases in length and rotates, keeping its point on a locus as illustrated, and comes to rest at $Ec'$. Since the conditions require the current and load voltage to remain constant, the length of these vectors is fixed but they rotate about a center point C to new positions maintaining the angle phi between them. The angle theta changes to a new angle theta prime as the current vector rotates, but the current vector is still at right angles to the capacitor voltage vector as above described and automatically sets the phase angle theta prime. The vector diagram illustrates by the variations in the capacitor vector length that there is a slight curvature in the relationship between the capacitor reactance requirement and the line voltage change. This relationship is particularly illustrated in Figure 3 which shows the reactance required for constant current in the circuit. For example, with regard to Figure 3, when the load is represented by a resistance and an inductance such as shown in Figure 1 and is placed in a series connection with a capacitor and with a voltage supply source, equations of the operating conditions are as follows:

$$E=IZ$$

or $$E=I\sqrt{r^2-(X1-Xc)^2}$$

The requirements for a constant load condition are that the current through the circuit of Figure 1 and the resistance and inductance of the load remain unchanged. If this is assumed for the above equation, then the equation can be differentiated with respect to the condenser reactance. The differential indicates that constant current can be secured by adjustment of the capacitor size as long as the supply voltage is above a certain minimum value. Therefore, Figure 3 illustrates the values of capacitance that will maintain constant current and load conditions in such a circuit. The curve illustrates a wide variation of line voltage over which changes in capacitative reactance maintain a linear relationship to the line voltage.

Having set forth the theoretical basis for the present invention, i.e. the manner in which the wattage of a load may remain invariable and unchanged with fluctuating input voltages, I provide a practical load wattage regulator for alternating current circuits consisting of a variable entity in series with the supply line in a reactive load circuit. This variable entity automatically corrects for line voltage fluctuations, permits the current, voltage and wattage of the load to remain invariable and constant and acts as if it were a variable capacitor whose values closely satisfy the requirements for various line voltages. This electrical entity is, therefore, able to automatically adjust itself as the line voltages change so that the changes in voltage do not affect the load.

I have found that adjustment of the values of the series capacitor to provide constant current as described, alters the voltages across it. I have utilized these changes in voltages across the capacitor to bring about the required automatic adjustment in capacitative reactance.

Therefore, in accordance with Figure 4, a capacitor 5 is shunted with an iron-cored reactor 6 such that current flow through the reactor is always less than the current flow through the capacitor 5. A selected resistance 7 is provided in series with the reactor (or forming part thereof) so that a new entity is formed which has capacitative reactance but of increased reactance to that of the unshunted capacitor. The combination comprising the capacitor 5 and its shunt reactor 6 is connected in at least one circuit supply line between a source of voltage and a conventionalized reactive load comprising a reactor 8 and resistance 9 in series connection. In the shunt combination, the total reactance varies with the current flowing in the reactor branch of the circuit. Iron cored reactors do not have a fixed value of reactance since reactance is a function of the permeability of the core material which in turn is affected by the voltage impressed across the coil. The reactance, therefore, varies with the applied voltage across the coil.

In my invention, I utilize a series capacitor shunted with an iron cored reactor and the reactance of this reactor is variable with the voltage across itself and the capacitor. The reactance of the capacitor is independent of the impressed voltage, but the reactance of the reactor is a variable. Since the shunt system still retains the characteristics of a capacitor, it has now become the equivalent of a variable capacitor, variable with the voltage across it. I have found that this change in reactance with voltage can be applied to the series capacitor of the circuit so that it automatically varies in the correct amount to exactly compensate for changes in the line voltage.

Current flowing through the reactor, because of its phase relationship with that of the capacitor, reduces the effect of the capacitor in the circuit. An increase in the reactor current produces the same effect as if the size of the capacitor were reduced. A reduction in the reactor current produces the effect that would result from an increase in the size of the capacitor. The increasing line voltage, while increasing the capacitor voltage, also simultaneously increases the reactor voltage and, therefore, the reactor current. The alteration in reactor current produces the equivalent condition of a change in the size of the capacitor so that the circuit reacts to changing input line voltages by equivalent changes in the effective series capacitor values. As long as the equivalent changes in capacitor values can exactly fill the required changes necessary for constant current conditions, it is possible to have constant current in the circuit.

In my invention, I have been able to secure this condition of constant current in the circuit and with it constant load conditions.

Figure 5 illustrates data taken on a circuit incorporating my invention and showing the line current to be constant and independent of the line voltage through wide changes in the values of the input voltage.

It is apparent from this description that this invention does not have to be restricted to a specific kind of load as long as the load is reactive. The illustrations given are conventionalized, i.e. they do not portray a specific circuit but indicate any circuit having resistance and inductance components. The load may assume any electrical form. There is no required relationship between the variable entity in the series circuit of the supply and an inductive component of the load. At no time are they equal or do they have to be and there is not a condition of resonance between the capacitative reactance of the variable entity and an inductive component of the load structure. Neither is there resonance in any ordinary arrangement of the series capacitor and the shunting reactor so that at all times the currents in the reactor are small compared with the capacitor currents.

Because the reactance of the variable series entity must at all times change in accordance with a definite pattern as the line voltage is varied, the range of maximum magnetic saturation of the iron in the reactor core is restricted usually to a portion near the knee of the magnetic saturation curve for the core material, and the series resistance of the reactor branch of the variable entity is critical to control the reactance of this branch to change within the required limits.

Although the operation of the circuit of this invention is not limited to highly reactive loads but can operate with a resistive load, the range of voltage and capacitor values for proper wattage adjustment are increased with a resistive load and, therefore, it is more difficult to secure good regulation of wattage over a wide range of input voltages with a resistive load, and the voltage applied to the resistive load is always less than that of the supply because of the reactance of the series capacitor.

Therefore, the characteristics of the shunting reactor employed in my invention are important and this has proven to be so in actual use and by experimental determination. For example, it was determined experimentally that the voltages that were to exist across the reactor and capacitor for 100 line volts were about 180 volts, and for 130 line volts were about 210 volts. The capacitor chosen for the load was about 33 microfarads. The current passing through the reactor at 180 volts was 0.38 ampere and at 210 volts was about 0.85 ampere. The resistance of the reactor circuit was adjusted to be about 48 ohms. The load was reactive and consumed about 110 watts at a line current of 2.0 amperes. The reactor was constructed of punched laminations of the shell type and these were interleaved although this was not found to be essential. The winding was chosen for the maximum current of 0.85 ampere. The resistance of the reactor circuit is critical for the best results and is operably established in accordance with the load.

With the reactor and capacitor in shunt connection placed in a line leading to the load, the power consumption of the load varied less than one-half percent while the line voltage was changed between 100 and 130 volts. Over much of the range, it was less than one-half percent.

Such load wattage regulation is applicable and highly desirable where the load comprises, for example, a reactive transformer, an electrical discharge device, an alternating current motor, etc., and the wattage consumed by such loads is rendered unaffected by variations of the input voltage.

What I claim is:

1. An automatic load wattage regulating circuit for alternating currents, comprising a non-resonant combination of a reactive power consuming load circuit and an automatically voltage sensitive capacitative means in series therewith capable of operating the load, said capacitative means being inserted in at least one supply line leading to said reactive power consuming load circuit, said capacitative means comprising a fixed capacitor of load selected reactance which is greater than the load impedance, said capacitor being shunted by a voltage sensitive branch circuit comprising an iron-cored reactor and a resistance in series therewith in said branch circuit, said resistance having a critical resistance value selected relative to the load and operative to limit the amount and rate of change of reactance of said reactor with changing currents and having at all times a reactance greater than that of said capacitor, said combination constituting a variable system responsive linearly with supply voltages.

2. An automatic load wattage regulating circuit for alternating currents, comprising a non-resonant combination of a reactive power consuming load circuit and inserted in at least one supply line leading thereto a voltage sensitive shunt combination of a fixed capacitor and a reactor, said reactor being a current limited reactor characterized by the passage of current therethrough which is always less than the current through said capacitor, the reactor branch of the shunt combination having an adjustable resistance in series with said reactor and of operably established value according to the load wattage and such that with increasing line voltage the load wattage remains substantially constant, said shunt combination having capacitative reactance operable in linear relationship to the applied line voltage.

References Cited in the file of this patent

UNITED STATES PATENTS

| | | |
|---|---|---|
| 1,985,634 | Fleming | Dec. 25, 1934 |
| 2,021,753 | Suits | Nov. 19, 1935 |
| 2,313,440 | Huge | Mar. 9, 1943 |

FOREIGN PATENTS

| | | |
|---|---|---|
| 846,704 | France | June 12, 1939 |